United States Patent [19]

Seppälä

[11] Patent Number: 4,690,991

[45] Date of Patent: Sep. 1, 1987

[54] PROCEDURE FOR MAKING COPOLYMERS OF ETHYLENE AND LONG-CHAINED ALPHA OLEFINS

[75] Inventor: Jukka Seppälä, Helsinki, Finland

[73] Assignee: Neste Oy, Finland

[21] Appl. No.: 711,575

[22] PCT Filed: Jun. 21, 1984

[86] PCT No.: PCT/FI84/00045

§ 371 Date: Feb. 4, 1985

§ 102(e) Date: Feb. 4, 1985

[87] PCT Pub. No.: WO85/00172

PCT Pub. Date: Jan. 17, 1985

[30] Foreign Application Priority Data

Jun. 22, 1983 [FI] Finland ............................ 83/2287

[51] Int. Cl.$^4$ ........................... C08F 2/14; C08F 210/6
[52] U.S. Cl. ................................. 526/158; 526/159; 526/348.2; 526/348.3; 526/348.6
[58] Field of Search ................. 526/348.2, 348.3, 158, 526/159

[56] References Cited

U.S. PATENT DOCUMENTS

| | | | |
|---|---|---|---|
| 3,222,332 | 12/1965 | Duck et al. | 526/348.2 |
| 3,645,992 | 2/1972 | Elston | 260/80.78 |
| 4,076,698 | 2/1978 | Anderson et al. | 526/348.6 |
| 4,304,890 | 12/1981 | Suzuki et al. | 526/348.2 |
| 4,322,514 | 3/1982 | Miyoshi et al. | 526/348.3 |

FOREIGN PATENT DOCUMENTS

| | | | |
|---|---|---|---|
| 0010428 | 4/1980 | European Pat. Off. | |
| 1007104 | 10/1965 | United Kingdom | 526/158 |

Primary Examiner—Edward J. Smith
Attorney, Agent, or Firm—Steinberg & Raskin

[57] ABSTRACT

The present invention concerns a procedure for copolymerization of ethylene and alpha olefins with at least eight carbon atoms in the presence of a catalyst of Ziegler-Natta type to become a polymer, in which the quantity of alpha olefin containing at least eight carbon atoms can be regulated between 0.01 and 15% by weight. Polymerization is carried out at a temperature not exceeding 120° C. in a fluid in which the polymer is insoluble. The monomer mixture contains, for increasing the reactivity of the long-chained alpha olefin, 0.01 to 2.0 mol/dm$^3$ of short-chained alpha olefin with not more than five carbon atoms. The alpha olefin containing not more than five carbon atoms is preferably 1-butylene or propylene.

12 Claims, 1 Drawing Figure

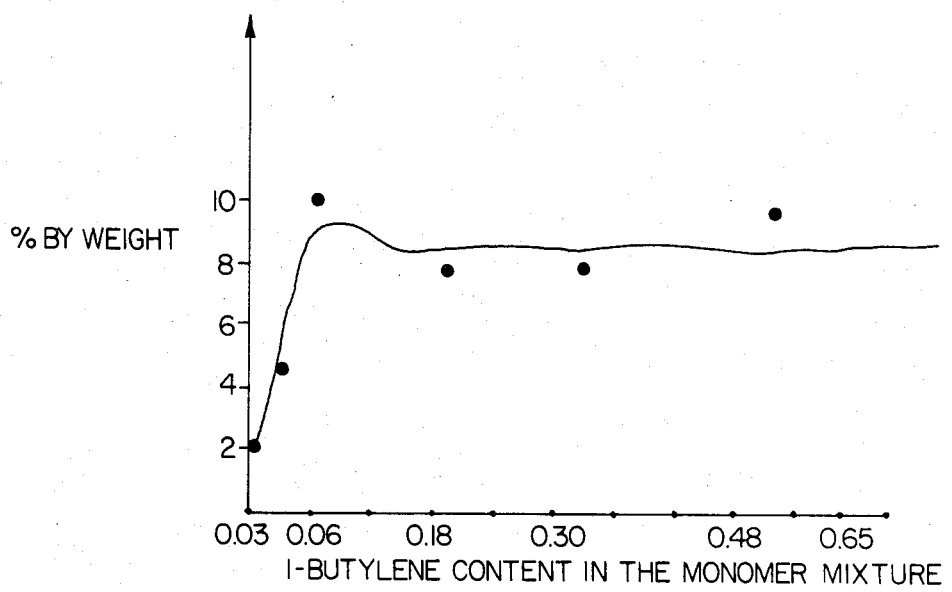

PROCEDURE FOR MAKING COPOLYMERS OF ETHYLENE AND LONG-CHAINED ALPHA OLEFINS

BACKGROUND OF THE INVENTION

The present invention concerns a procedure for making mixed polymers of ethylene and long-chained alpha olefins. To be more precise, the invention concerns a procedure for making copolymers of ethylene and long-chained alpha olefins in which the density and melting point of the polymer can within given limits be regulated independent of each other and in which the quantity of long-chained alpha olefin can be easily regulated in a wide range in suspension polymerization.

For copolymerizing ethylene with olefins with the purpose of making LLDP (linear low density polyethylene) a number of commercial procedures are known in prior art, in which the most commonly used alpha olefins are 1-butylene and 1-octylene. In suspension and gas phase polymerization, 1-butylene is as a rule used, whereas in solution polymerization 1-octylene is used. The tensile strength, tearing strength and piercing strength of films made from copolymers are as a rule better when the comonomer is a long-chained alpha olefin, and it is therefore advantageous to be able to include them in the polymer.

Copolymerization of ethylene and long-chained alpha olefins containing more than eight carbon atoms by solution and gas phase polymerizing is commonly known in the patent literature. In suspension polymerization, in contrast, long-chained alpha olefins containing more than eight carbon atoms could not be used because at the low temperatures employed, the reactivity of long-chained alpha olefins is not sufficient. If it is specifically desired to make copolymers in which the quantity of long-chained alpha olefin is relatively high, one would have to use excessively high alpha olefin monomer contents in suspension polymerization. This, however, entails the drawback that the polymer being produced swells and the reactor gets dirty. The proportion of long-chained alpha olefin in the polymer still cannot be made high enough in this way. As a result, the making of copolymers of ethylene and long-chained alpha olefins by suspension polymerizing is not commercially practiced, and even in other methods the use of copolymers with more than eight carbon atoms is not often presented, not even in the examples of patent specifications.

SUMMARY OF THE INVENTION

According to the invention, it has been unexpectedly found that by polymerizing ethylene and alpha olefins containing at least eight carbon atoms by the suspension method at a temperature under 120° C., it is possible in a simple way to increase the reactivity of long-chained alpha olefins. Since in this instance no excess of the long-chained alpha olefin monomer need be used, swelling of the polymer that is obtained and soiling of the reactor are also avoided. Through the increase of reactivity, the proportion of long-chained alpha olefin in the polymer can be significantly increased.

The procedure of the invention for making mixed polymers of ethylene and alpha olefins containing at least eight carbon atoms in the presence of a catalyst of Ziegler-Natta type to become mixed polymers in which the quantity of alpha olefins containing at least eight carbon atoms can be regulated within 0.01 to 15 percent by weight, is characterized in that polymerization is carried out at a temperature not higher than 120° C. in a fluid in which the polymer that is produced is insoluble, and that the monomer mixture contains, for the purpose of increasing the reactivity of the long-chained alpha olefin, 0.01 to 2.0 mols per $dm^3$ short-chained alpha olefin with no more than five carbon atoms.

BRIEF DESCRIPTION OF THE DRAWINGS

The FIGURE illustrates relationship between two components in the present invention.

DESCRIPTION OF THE PREFERRED EMBODIMENTS

The use of monomer mixtures containing long-chained alpha olefin and 1-butylene is in itself known in the art. For instance, in the European Patent Application No. 0 010 428, a procedure is disclosed for mixed polymerizing of ethylene, alpha olefin containing 3-4 carbon atoms and long-chained alpha olefin containing 5 to 18 carbon atoms. In the procedure solution polymerization is utilized at a comparatively high temperature, 130°–220° C. However, said publication presents no examples regarding the use of alpha olefins containing more than eight carbon atoms; nor has the effect of 1-butylene on the reactivity of the long-chained alpha olefin been observed in any way.

In the German application print No. 30 19 871 is described a two-phase polymerization where in the first phase ethylene is copolymerized in suspension in a fluid containing 3-4 carbon atoms. The monomers are in said procedure preferably alpha olefins containing 3-4 carbon atoms or mixtures thereof. In the second phase of the procedure, the fluid is evaporated off and the reaction is continued as a gas phase polymerization. The comonomers are in this procedure defined as having a length not greater than ten carbon atoms, and no advantage is stated to be gained by simultaneous use of a short-chained and a long-chained alpha olefin.

The German Patent No. 29 47 921 concerns the manufacturing of medium or low density copolymers of ethylene using alpha olefins, by gas phase polymerizing. According to the publication, the polymerization is carried out with ethylene and propylene and/or 1-butylene and alpha olefins containing 6 to 12 carbon atoms. Hereby, polymers are obtained with density 0.900–0.945 $kg/dm^3$. The use of heavy hydrocarbons is, however, impossible in the gas phase because long-chained alpha olefins have a low vapour pressure.

None of the references cited above reveals the observation constituting the basis of the present invention: that copolymers of ethylene containing higher contents than before of long-chained alpha olefin can be made by suspension polymerization if, at polymerizing, a short-chained alpha olefin is present, for instance 1-butylene, even if in minimal amount. The 1-butylene causes the reactivity of the long-chained alpha olefin to be much higher than if no 1-butylene is present. Said copolymers have therefore an obvious interaction on each other.

Particularly surprising is the observation of the invention that the increase in reactivity of the long-chained alpha olefin is strongest when the 1-butylene content is very low. Therefore, in the polymer being produced the proportion of long-chained alpha olefin can be varied within very wide limits by the aid of small 1-butylene additions.

Thus, according to the invention, the possibility is gained to regulate within certain limits the properties of the polymer that is being produced. First, the melting temperature of the product is determined according to its 1-butylene content. The melting point does not essentially change as the quantity of long-chained alpha olefin increases. Secondly, the crystallinity of the product decreases with increasing content of long-chained alpha olefin. This causes further that the density decreases powerfully from the value typical of ethylene/1-butylene copolymers when the content of long-chained alpha olefin increases and that of 1-butylene remains constant in the monomer mixture. In this way by suspension polymerizing, mixed polymers with low density can be obtained. In addition, the mechanical properties of the product are excellent.

By the method of the invention, mixed polymers of ethylene can be made by the suspension procedure having densities down to 0.900 kg per $dm^3$ and which may contain up to 15 percent by weight of long-chained alpha olefin containing at least eight carbon atoms, preferably at least ten carbon atoms, or a mixture thereof.

By low pressure suspension polymerization, ethylene/alpha olefin copolymers can be produced which have density less than 920 $g/dm^3$, even 90–910 $g/dm^3$.

From the polymer produced according to the procedure, mechanically strong film is obtained which has ultimate tensile strength 30–60 MPa, even 80 MPa.

In the procedure of the invention, polymerization is carried out in a hydrocarbon suspension. For fluid, any liquid hydrocarbon may be used which is inert towards the monomers. A suitable hydrocarbon fluid is for instance n-heptane. The reaction temperature in the polymerization is selected in the range 0°–120° C., preferably in the range 70°–90° C.

The alpha olefin contents in the reaction mixture depend on how much alpha olefin is desired in the product. As a rule, the monomer supplied into the polymerizing reactor contains 1-butylene 0.01–2.0 $mol/dm^3$ and long-chained alpha olefin 0.1–2 $mol/dm^3$.

The long-chained alpha olefin contains at least eight carbon atoms, preferably at least ten carbon atoms. With alpha olefins containing less than ten carbon atoms, the increase of reactivity is not yet significant, neither are the characteristics of the polymers as good as when using alpha olefins containing at least 10, preferably 12–16 carbon atoms. Alpha olefins may, of course, also be used in mixture. Examples of suitable alpha olefins are, for instance: 1-decylene, 1-undecylene, 1-dodecylene, 1-tridecylene, etc. When the number of carbon atoms rises over 20, the respective alpha olefins are solid at room temperature already and therefore no longer competitive as to their price in the procedure of the invention.

The reaction pressure in the polymerizing reactor is usually kept on the same level as in general in suspension polymerization of ethylene, that is, at 0–70 bar gauge pressure.

For the catalyst in the polymerizing process, catalysts of the same type are used as in general in coordination polymerizing ethylene. Catalysts of this kind belong to the coordination catalysts and they are thus complexes composed of organometallic compounds of groups I–III and of a transition metal salt of groups IV–VIII. $TiCl_3$, complexes of $\frac{1}{3}$ $AlCl_3$ and $Et_3Al$ are highly appropriate catalysts in the procedure of the invention. Also the use of various carrier catalysts is possible, as it is in general in coordination polymerization of ethylene.

EXAMPLES

Performing the polymerizations

In a nitrogenated 4 $dm^3$ reactor, 3 $dm^3$ dried heptane were introduced. The heptane was nitrogenated for about half an hour for removing the dissolved oxygen, if any. The catalysts prepared in a nitrogen chamber were added through the cover of the reactor, first aluminium alkyl, and then the titanium compound. When liquid comonomers were used they were added after the catalysts with a syringe through the cover of the reactor. The reactor was closed, and the gaseous comonomer to be used (1-butylene) was added. Hydrogen was added to bring its partial pressure to desired level. The reactor was heated to the polymerization temperature and with ethylene supply the pressure was kept at the polymerizing temperature chosen. With oil circulating in the jacket of the reactor, the temperature of the reactor was kept at the polymerizing temperature chosen.

On completion of the polymerizing time, the supply of ethylene was discontinued and the reactor was cooled. The produced polymer sludge was removed from the reactor through a bottom valve. To it was added 2 $dm^3$ isopropanol for deactivating the catalyst. The mixture was filtrated through a sinter, and the polyethylene thus obtained was washed with 2 $dm^3$ of heptane and with 1 $dm^3$ of a 10% by weight mixture of hydrochloric acid and methanol until no more chloride was precipitated from the filtrate by silver nitrate. The polymer was dried to constant weight either in a heating chamber or in a fluidized bed drier. The temperature of the heating chamber was 80° C. and the temperature of the blast air in the fluidized bed drier was 60° C.

EXAMPLE 1

In the manner as above, polymerization was carried out in a half-charge type 4 $dm^3$ mixing reactor. The coordination catalyst was composed of aluminium-activated titanium chloride ($TiCl_3 \times \frac{1}{3} AlCl_3$) and triethylaluminium. The quantities used were respectively 0.93 mmol and 2.04 mmol. The fluid in the reactor was 3 $dm^3$ heptane.

Into the reactor were added 0.48 $mol/dm^3$ 1-butylene and 0.48 $mol/dm^3$ of 1-decylene. The partial pressure of hydrogen in the reactor was adjusted to be 300 kPa. The temperature in the reactor was maintained at 80°–83° C., and the pressure was kept constant.

After two hours reaction time, 415 g polymer were obtained. In the polymer, the weight proportion of 1-decylene was 5.7 percent by weight. Melting point 127° C., crystallinity 48%, density 925 $g/dm^3$.

EXAMPLE 2

Copolymerizing was carried out as in Example 1, but the 1-butylene was omitted from the reaction mix. The conditions of reaction are given in Table 1. The yield was 463 g polymer with 1-decylene content lower than 3% by weight. The product that was obtained was close to HDPE, having density 946 $g/dm^3$, crystallinity 64% and melting point 135° C.

EXAMPLE 3

Copolymerization was carried out in the same way as in Example 1, except that only 1-butylene was used for comonomer, at 0.48 $mol/dm^3$. The polymer yield was 377 g and density 928 g/dm³. The melting point was 127° C. and crystallinity 48%.

EXAMPLES 4, 5, 6, 7 AND 8

Under the conditions specified in Table I, and otherwise as in Example 1, copolymers of ethylene, 1-butylene and 1-decylene were prepared. The properties of the products have been compiled in Table II. The lowest densities reached in the series were 914 g/cm³, the copolymer then containing 13.5% by weight of 1-decylene.

EXAMPLE 9

At the temperature of 80° C., ethylene and 1-decylene were polymerized with the catalyst quantities stated in Table I and otherwise as presented in Example 2. The polymer yield was 185 g and density 940 g/cm³. The crystallinity was 59% and the melting point, 130° C.

In Table I are given the polymerizing conditions applied in Examples 1–9 and in Table II, the properties of the polymers obtained. The test results reveal that by adding 1-butylene to the reactor, the 1-decylene could also be made to react. Thereby the values of crystallinity, density and melting points also clearly changed.

The 1-dodecylene content in the polymer was less than 3% by weight.

EXAMPLE 12

Copolymerization was carried out as in Example 1, however so that the long-chained alpha olefin was 1-hexadecylene. 222 g polymer was obtained, with melting point 125° C., crystallinity 38% and density 913 g/dm³. The 1-hexadecylene content in the polymer was found to be 11% by weight.

EXAMPLE 13

Copolymerization was carried out as in Example 1, however so that for comonomer was used only 1-hexadecylene. 40 g polymer was obtained with melting point 137° C., crystallinity 65% and density 943 g/dm³. The 1-hexadecylene content was so low that it could not be quantitatively observed in the $^{13}C$ NMR spectrum, i.e., it was less than 0.5% by weight.

EXAMPLE 14

Copolymerization was carried out as in Example 1, however so that the long-chained alpha olefin was 1-octylene. 90 g polymer was obtained, with melting

Table I

| | Catalyst | | P | Comonomers | | Total | P | | Reaction | |
|---|---|---|---|---|---|---|---|---|---|---|
| Example | Et₃Al mmol | Ti comp. mmol | C₂H₄ kPa | 1-but. mol/dm³ | 1-dec. kPa | pressure kPa | H₂ °C. | Temperature hrs | Time | Yield g |
| 1 | 2.04 | 0.93 | 700 | 0.48 | 0.48 | 1110 | 300 | 80–83 | 2 | 415 |
| 2 | 2.15 | 0.98 | 700 | — | 0.48 | 1050 | 300 | 77–82 | 2 | 463 |
| 3 | 3.30 | 1.50 | 700 | 0.48 | — | 1100 | 300 | 79–80 | 2 | 377 |
| 4 | 2.79 | 0.0279 | 700 | 0.48 | 0.48 | 1100 | 300 | 80–85 | 2 | 602 |
| 5 | 2.62 | 1.19 | 700 | 0.48 | 0.24 | 1040 | 300 | 80 | 2 | 415 |
| 6 | 2.53 | 1.15 | 700 | 0.48 | 0.48 | 1100 | 300 | 90 | 2 | 238 |
| 7 | 2.29 | 1.04 | 700 | 0.48 | 0.24 | 1110 | 300 | 85–90 | 2 | 244 |
| 8 | 2.66 | 1.21 | 700 | 0.48 | 0.24 | 1090 | 300 | 90 | 2 | 402 |
| 9 | 1.91 | 0.87 | 700 | — | 0.48 | 1080 | 300 | 87–90 | 2 | 185 |

TABLE II

Compositions and physical characteristics of the polymers

| Example | Side chains of 1-butylene per 100 carbons | Weight proportion of 1-butylene, % | Side chains of 1-decylene per 100 carbons | Weight proportion of 1-decylene, % | $T_m$ °C. | Crystallinity % | Density g/dm³ | $M_v$ 10⁵ g/mol | $\overline{M_w}/\overline{M_n}$ |
|---|---|---|---|---|---|---|---|---|---|
| 1 | 1.2 | 4.5 | 0.6 | 5.7 | 127 | 48 | 925 | 2.0 | 9.3 |
| 2 | — | — | <0.3 | <3 | 135 | 64 | 946 | 3.5 | 7.5 |
| 3 | 0.9 | 3.6 | — | — | 127 | 48 | 928 | 2.0 | — |
| 4 | 2.0 | 7.5 | 0.5 | 4.7 | 126 | 45 | 923 | 0.7 | 5.4 |
| 5 | 0.8 | 2.9 | 0.2 | 2.2 | 127 | 48 | 928 | 1.5 | 7.6 |
| 6 | 2.4 | 8.1 | 1.6 | 13.5 | 125 | 36 | 914 | 1.1 | |
| 7 | 1.4 | 5.4 | 0.3 | 2.8 | 125 | 40 | 922 | 1.2 | |
| 8 | 1.2 | 4.5 | 0.5 | 4.8 | 125 | 42 | 921 | 1.2 | |
| 9 | — | — | 0.3 | 3.0 | 130 | 59 | 940 | 2.5 | |

EXAMPLE 10

Copolymerization was carried out as in Example 1, however so that the long-chained alpha olefin was 1-dodecylene. 580 g polymer were obtained, with melting point 127° C., crystallinity 38%, density 913 g/dm³. By $^{13}C$ NMR analysis, the 1-dodecylene content was found to be 8.5% by weight.

EXAMPLE 11

Copolymerization was carried out as presented in Example 10, but using for comonomer only 1-dodecylene. 420 g polymer was obtained, with melting point 136° C., crystallinity 67% and density over 944 g/dm³.

point 125° C., crystallinity 41% and density 917 g/dm³. The 1-octylene content in the polymer was found to be 5.7% by weight.

EXAMPLE 15

Copolymerization was carried out as in Example 2 with the exception that for comonomer only 1-octylene was used. 156 g polymer was obtained, with melting point 129° C., crystallinity 56% and density 936 g/dm³. The content of 1-octylene in the copolymer was found by analysis to be 3.9% by weight.

In Table III are presented the polymerizing proportions used in Examples 10-15 and in Table IV, the properties of the polymers obtained.

TABLE III

Polymerizing conditions in Examples 10-15.

| | Catalyst | | P | Comonomers | | | | | | | |
|---|---|---|---|---|---|---|---|---|---|---|---|
| Example | Et$_2$Al mmol | Ti comp. mmol | C$_2$H$_4$ KPa | 1-but. mol/dm$^3$ | long-chain α-olefin mol/dm$^3$ | Total pressure kPa | P H$_2$ kPa | Temperature °C. | Reaction Time hrs | Yield g | Cat. act. gPE/(gTi · 4 h) |
| | | | | | Dodecylene | | | | | | |
| 10 | 3.1 | 1.4 | 700 | 0.48 | 0.48 | 1070 | 300 | 80 | 2 | 580 | 17020 |
| 11 | 1.88 | 0.86 | 700 | — | 0.48 | 1030 | 300 | 80 | 2 | 418 | 20250 |
| | | | | | Hexadecylene | | | | | | |
| 12 | 2.0 | 0.93 | 700 | 0.48 | 0.24 | 1010 | 300 | 80 | 2 | 222 | 9950 |
| 13 | 2.5 | 1.2 | 700 | — | 0.48 | 1030 | 300 | 78 | 2 | 40 | 1380 |
| | | | | | Octylene | | | | | | |
| 14 | 2.2 | 1.0 | 700 | 0.48 | 0.48 | 1120 | 300 | 90 | 2 | 90 | |
| 15 | 2.4 | 1.1 | 700 | — | 0.48 | 1070 | 300 | 89 | 2 | 156 | |

TABLE IV

Characteristics of the polymers in Examples 10-15.

| Example | 1-butylene content % by wt. | long-chain olefin content, percent by weight | Tm/°C. | Crystallinity % | Density g/dm$^3$ | M$_v$ 10$^5$ g/mol | $\overline{M_w}/\overline{M_n}$ |
|---|---|---|---|---|---|---|---|
| | | Dodecylene | | | | | |
| 10 | 7 | 8.5 | 127 | 38 | 913 | 1.3 | 8.2 |
| 11 | — | Less than 3 | 136 | 67 | Over 944 | 3.9 | 6.2 |
| | | Hexadecylene | | | | | |
| 12 | 7 | 11 | 125 | 38 | 913 | 1.4 | 10 |
| 13 | — | Less than 0.5 | 137 | 65 | 943 | 4.7 | 6.2 |
| | | Octylene | | | | | |
| 14 | 6 | 5.7 | 125 | 41 | 917 | 1.2 | 7.5 |
| 15 | — | 3.9 | 125 | 46 | 923 | 2.5 | 8.2 |

EXAMPLE 16

A test series was carried out in which the quantity of long-chained alpha olefin (1-dodecylene) in the monomer mixture was kept constant (0.48 mol/dm$^3$) and the quantity of 1-butylene was varied in the range of 0-0.65 mol/dm$^3$. The polymerization was accomplished as in Example 1. In Table V, the characteristics of the polymers obtained are presented. In the FIGURE is shown the dependence of the 1-dodecylene content of the polymer on the 1-butylene quantity added into the reactor.

Table V and the FIGURE reveal clearly that even the 0.06 mol/dm$^3$ 1-butylene addition sufficed to raise the 1-dodecylene content of the polymer from the level under 3% by weight to the level of 7-10% by weight. The density has decreased from the level 939 g/dm$^3$ to below the level of 926 g/dm$^3$. In the test series, even one density as low as 908 g/dm$^3$ was achieved.

TABLE V

Compositions of polymer

| Test | 1-butylene initially added mol/dm$^3$ | 1-but. content % by wt. | 1-dod. content % by wt. | Density g/dm$^3$ | Crystallinity % | Melting temp. °C. |
|---|---|---|---|---|---|---|
| 75 | — | — | <3 | 938 | 60 | 132 |
| 91 | 0;03 | 0;9 | 3-5 | 930 | 59 | 130 |
| 87 | 0;06 | 1;6 | 9;6 | 926 | 48 | 125 |
| 88 | 0;18 | 4;6 | 7;4 | 924 | 46 | 126 |
| 89 | 0;30 | 4;4 | 7;5 | 923 | 44 | 125 |
| 73 | 0;48 | 6;2 | 8;0 | 908 | 32 | 124 |
| 90 | 0;65 | 6;7 | 8;1 | 913 | 35 | 123 |

I claim:

1. Method of forming a terpolymer having a density of at least about 0.900 kg/dm$_3$ of an at least 11 carbon atom olefin, ethylene and 1-butylene, which comprises polymerizing ethylene with said long-chain α-olefin of at least 11 carbon atoms, by suspension polymerization in the presence of a catalyst composed of Al-activated titanium chloride and triethyl aluminum to form a terpolymer thereof, said polymerization being effected at a temperature of up to 120° C. in a fluid in which the resulting terpolymer is insoluble, in the presence of about 0.01–2.0 mol/dm$_3$ of 1-butylene, whereby the reactivity of the long-chain α-olefin is increased, and the quantity of long-chain α-olefin in the resulting terpolymer is regulated to between about 0.01 and 15% by weight.

2. Procedure according to claim 1, characterized in that the density of the terpolymer is selected by changing the content of α-olefin containing at least 11 carbon atoms.

3. Procedure according to claim 1, characterized in that the long-chain α-olefin is 1-undecylene, 1-dodecylene, 1-tridecylene, 1-tetradecylene, 1-pentadecylene, 1-hexadecylene, 1-heptadecylene, 1-octadecylene, 1-nonadecylene, 1-eikocylene or a mixture containing these monomers.

4. the method of claim 1, wherein the temperature is in the range of about 70°–90° C.

5. The method of claim 4, wherein the temperature is in the range of about 80°–83° C.

6. The method of claim 1, wherein the amount of the long-chain α-olefin which is reacted is about 0.1-2 mol/dm$^3$.

7. The method of claim 1, wherein the long-chain α-olefin contains 12-16 carbon atoms.

8. The method of claim 1, wherein the polymerizing is carried out in a reactor at about 0–70 bar gauge pressure.

9. The method of claim 8, comprising the steps of
charging the fluid into the reactor,
charging the triethyl aluminum into the reactor,
charging the titanium chloride into the reactor,
charging the long-chain α-olefin and 1-butylene into the reactor,
raising temperature and pressure within the reactor to polymerizing levels, and
adding ethylene to the reactor while maintaining the temperature and pressure at said levels.

10. The method of claim 1, wherein the amount of the butylene which is reacted is about 0.03–0.65 mol/dm$^3$.

11. The method of claim 1, wherein polymerizing molar ratio of butylene:long-chain α-olefin is from about 1:1 to 2:1.

12. The method of claim 1, wherein polymerizing molar ratio of butylene:long-chain α-olefin is from about 1:16 to 11:8.

* * * * *